United States Patent
Willhelm

(10) Patent No.: US 6,747,262 B2
(45) Date of Patent: Jun. 8, 2004

(54) POSITION MEASURING SYSTEM

(75) Inventor: Joerg Willhelm, Wetzlar Nauborn (DE)

(73) Assignee: Dr. Johannes Heiden Lain GmbH, Traunrew (DE)

( * ) Notice: Subject to any disclaimer, the term of this patent is extended or adjusted under 35 U.S.C. 154(b) by 0 days.

(21) Appl. No.: 10/289,632

(22) Filed: Nov. 7, 2002

(65) Prior Publication Data

US 2003/0062470 A1 Apr. 3, 2003

Related U.S. Application Data

(62) Division of application No. 09/586,271, filed on Jun. 2, 2000, now Pat. No. 6,545,262.

(30) Foreign Application Priority Data

Jun. 4, 1999 (DE) .......................... 199 27 034

(51) Int. Cl.⁷ .............................. G01J 1/42; G01D 5/34
(52) U.S. Cl. ............................ 250/208.2; 250/214 R; 250/231.16
(58) Field of Search .................. 250/231.13, 237 G, 250/231.14, 231.17, 231.18, 231.16, 214 R, 208.2; 341/11, 13; 356/138

(56) References Cited

U.S. PATENT DOCUMENTS

| | | | |
|---|---|---|---|
| 4,782,229 A | | 11/1988 | Ernst |
| 4,985,623 A | * | 1/1991 | Ichikawa et al. ...... 250/231.16 |
| 5,279,044 A | | 1/1994 | Bremer |
| 5,456,021 A | | 10/1995 | Nelle et al. |
| 5,563,408 A | | 10/1996 | Matsumoto et al. |
| 5,841,134 A | * | 11/1998 | Burgschat et al. ...... 250/237 G |
| 5,981,942 A | * | 11/1999 | Ieki ........................ 250/231.16 |
| 6,034,378 A | * | 3/2000 | Shiraishi ................ 250/559.29 |
| 6,198,534 B1 | | 3/2001 | Hofer et al. |
| 6,392,224 B1 | | 5/2002 | Holzapfel et al. |
| 6,452,159 B2 | | 9/2002 | Holzapfel et al. |
| 6,525,311 B1 | * | 2/2003 | Burgschat ............... 250/237 G |

FOREIGN PATENT DOCUMENTS

| | | |
|---|---|---|
| DE | 44 36 784 A1 | 4/1995 |
| DE | 195 27 287 A1 | 1/1997 |
| DE | 198 30 925 A1 | 2/1999 |
| JP | 59-226822 | 12/1984 |
| WO | WO 97/05457 | 2/1997 |

OTHER PUBLICATIONS

Willhelm, J., "Dreigitterschrittgeber (Three Grid Encoder)", available as of Mar. 13, 1978 in the Hannover University Library, pp. 59–64.

U.S. patent application Ser. No. 09/706,365, Burgschat, filed Nov. 3, 2000.

* cited by examiner

Primary Examiner—David V. Bruce
Assistant Examiner—Chih-Cheng Glen Kao
(74) Attorney, Agent, or Firm—Brinks Hofer Gilson & Lione

(57) ABSTRACT

A position measuring system for determining the relative position of a first object and a second object movable relative to one another that includes an incremental track, associated with a first object and having a periodic line structure that has individual lines and a scanning unit, associated with a second object movable relative to the first object, that scans said periodic line structure and that generates a corresponding incremental signal. A sensor system that generates absolute position information pertaining to the relative position of the first and second objects, wherein the width of the individual lines, as measured along a longitudinal direction of the incremental track, varies over at least a portion of the breadth of the incremental track, as measured in a direction transverse to the longitudinal direction, in such a way that a structure with absolute position information is superimposed on the periodic line structure.

15 Claims, 3 Drawing Sheets

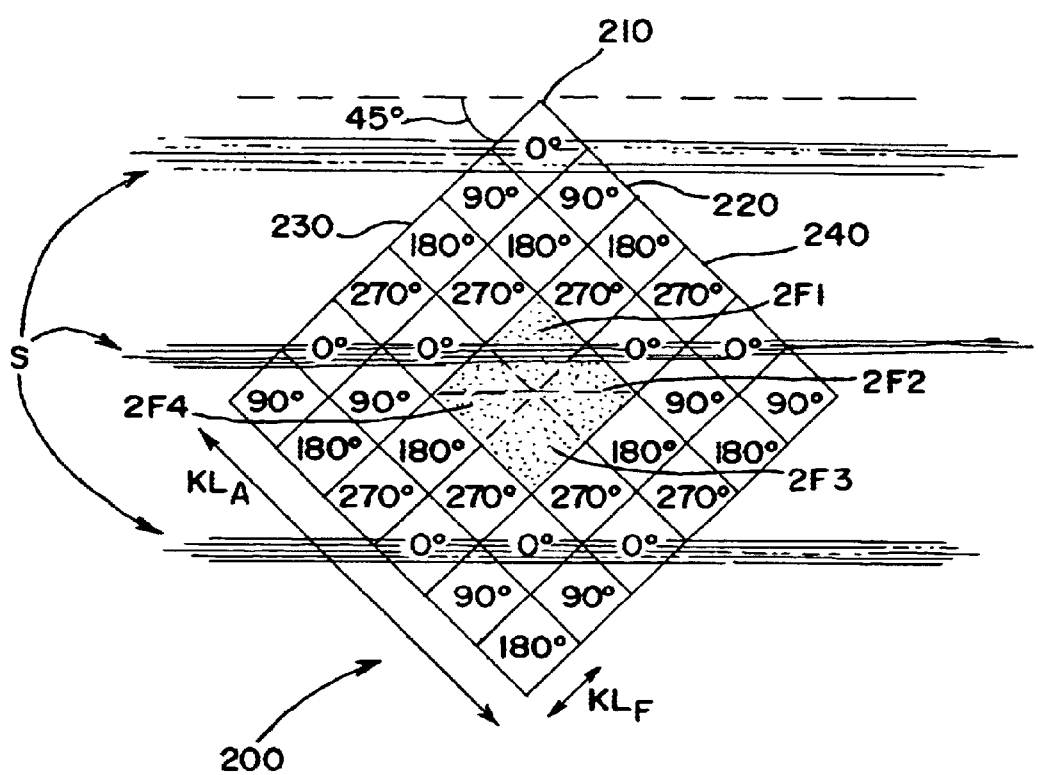

POSITION MEASURING SYSTEM

This application is a divisional application of U.S. patent application Ser. No. 09/586,271, filed Jun. 2, 2000 now U.S. Pat. No. 6,454,262, the entire contents of which are incorporated herein by reference.

Applicants claim, under 35 U.S.C. § 119, the benefit of priority of the filing date of Jun. 4, 1999 of a German patent application, copy attached, Serial Number 199 27 034.1, filed on the aforementioned date, the entire contents of which is incorporated herein by reference.

BACKGROUND OF THE INVENTION

1. Field of the Invention

The present invention relates to a position measuring system for determining the relative position of two objects relative to one another.

2. Discussion of Related Art

In one such incremental position measuring system, a code carrier in the form of a scale (in the case of a linear measuring system) or a graduated disk (in the case of a rotary measuring system) is associated with the first of the two objects movable relative to one another and has an elongated incremental track with a periodic line structure. The line structure of the incremental track is scanned with a scanning unit, associated with the second object, in the form of a suitable sensor system. From the output signals of the sensor system, using an evaluation unit, the amount of the displacement of the two objects relative to one another can be determined relative to the position at which the two objects were located when the position measuring system was turned on. This makes it possible (if the relative position of the objects when the position measuring system was turned on is known) to make a continuous determination of the position of the two objects relative to one another.

In many applications, it is necessary, in addition to the high-precision incremental position measurement, to make absolute position information available, to enable determining the position of the two objects relative to one another directly. To do so, it is usual to dispose an additional reference or synchronizing track on the code carrier next to the incremental track, and from this additional track the position of the objects movable relative to one another can be determined directly. However, the additional track means that increased space is required on the code carrier.

Another possible way of generating absolute position information in an incremental position measuring system is known from Japanese Patent Disclosure JP-A 59-22 6822 for an angle measuring system, which as a code carrier has a graduated disk on which an incremental track extends along its circumference. The width of the incremental track varies transversely to its longitudinal direction on the graduated disk. This variation leads to a modulation in the amplitude of the incremental signal that accordingly contains the absolute position information. Here, however, the problem is that electronically separating the incremental signal component from the absolute position component is very complicated.

OBJECTS AND SUMMARY OF THE INVENTION

An object of the present invention is to create an incremental position measuring system of the type defined at the outset in which with the simplest possible structure, absolute position information about the position of the two objects movable relative to one another can be obtained.

The above object is attained according to the invention by the creation of a position measuring system for determining the relative position of a first object and a second object movable relative to one another that includes an incremental track, associated with a first object and having a periodic line structure that has individual lines and a scanning unit, associated with a second object movable relative to the first object, that scans said periodic line structure and that generates a corresponding incremental signal. A sensor system that generates absolute position information pertaining to the relative position of the first and second objects, wherein the width of the individual lines, as measured along a longitudinal direction of the incremental track, varies over at least a portion of the breadth of the incremental track, as measured in a direction transverse to the longitudinal direction, in such a way that a structure with absolute position information is superimposed on the periodic line structure.

Accordingly, the width of the individual lines of the incremental track varies along the longitudinal direction of the incremental track in such a way that a structure with absolute position information is superimposed on the periodic line structure. The periodicity of the underlying line structure can be preserved by providing that the spacings of the longitudinal axes of the individual lines are kept constant along the longitudinal direction of the incremental track.

An embodiment of the present invention is based on the recognition that the desired absolute position information can be obtained directly from the line structure of the incremental track itself, if the width of the lines is varied while maintaining their periodic arrangement. In other words, as in a conventional incremental track, the lines are disposed at a constant spacing with respect to their individual longitudinal axes; only the width of the lines varies transversely to the longitudinal axes (hereinafter called variation of the line width). The integration of the absolute position information into the line structure of the incremental track makes an especially compact structure of the position measuring system possible, since only a single track has to be scanned.

An embodiment of the present invention appears at first glance, because of the variation in the breadth of the lines in the longitudinal direction of the incremental track, not to allow the generation of a periodic incremental signal. However, according to the present invention, there are many possible ways of varying the individual line width in such a way that with a suitable scanning system, it is readily possible both to generate the periodic incremental signal and to generate a signal containing the absolute position information.

The variation in the line width need not necessarily take place over the entire breadth of the incremental track as measured transversely to its longitudinal direction. Instead, the variation in the line width can also be provided over only part of the breadth of the incremental track. (In the claims, for the sake of conciseness and greater clarity of the claims, the breadth of the incremental track transversely to its longitudinal direction has been called the breadth of the incremental track, for short.)

In a preferred embodiment of the invention, the individual lines of the incremental track each have a plurality of portions of different line width; the widths of the individual portions of a line are each selected such that all the lines of the incremental track cover essentially the same area on the code carrier. Correspondingly (given a constant spacing of the longitudinal axes of the lines), the interstices (gaps) between the adjacent lines each cover substantially the same area. Thus, there is a constant ratio of line width to gap width along the incremental track, which allows the generation of an incremental signal with a constant amplitude.

The variation of the line width is preferably formed in accordance with an oscillating function, and, in particular, a periodically oscillating function. In the case of a rotary measuring system, this readily makes it possible to generate a piece of absolute position information, if the period of the oscillating function is at least as great as the length of the incremental track. In the case of linear measuring systems, by comparison, it can be expedient to superimpose at least two and preferably three periodically oscillating functions on the incremental track, the periods of which functions differ slightly from each other, so that the absolute position information is generated by the Nonius or Vernier principle.

To create the aforementioned portions of different width of the individual lines of the incremental track, the incremental track can be subdivided transversely to its longitudinal extent into two or more partial tracks that each has a characteristic variation of the line width.

In a preferred embodiment of the present invention, the variation of the line width of the lines in the individual partial tracks in each case occurs by the same mathematical function, but there is a phase difference between different partial tracks. As mathematical functions, periodically oscillating functions, and above all the trigonometric functions, are especially suitable.

If each partial track having a certain trigonometric function has the corresponding trigonometric function phase-displaced by one-half of a period associated with it, then an offset-free sensor signal for ascertaining the absolute position can be generated by jointly evaluating the signals originating in these two partial tracks.

If for each partial track having a certain periodically oscillating function, a further partial track is provided whose trigonometric function is phase-displaced by less than one-half of a period, and in particular by one-quarter of a period, then along with the position of the two objects movable relative to one another, their direction of motion can be ascertained as well.

In an advantageous embodiment of the present invention, at least four, and preferably five partial tracks are provided, and the trigonometric functions of adjacent partial tracks are each phase-displaced relative to one another by one-quarter of a period. As a result, cross-talk between the individual channels of the sensor system that are associated with side-by-side partial tracks can be compensated for.

To generate the absolute position, each partial track of the incremental track is assigned its own sensor on the other one of the two objects movable relative to one another, and preferably two sensors spaced apart from one another in the longitudinal direction of the incremental track are provided, which are disposed on both sides of the scanning unit for generating the incremental signals.

Advantageously, both the scanning unit for generating the incremental signals and the additional sensors for generating signals with absolute position information are each formed by photoelements, to which a common light source is assigned. Since according to the present invention the incremental track can at the same time also include the absolute position information pertaining to the position of the two objects movable relative to one another, the scanning unit for generating the incremental signals and the additional sensors for generating the absolute position information can be placed close together and supplied with light from a common light source. This light source illuminates the incremental track, and from there the light (in an incident light or transmitted light process) reaches the photoreceivers.

As the scanning unit for generating the incremental signals, a sensor matrix of the kind known from International Patent Disclosure WO 97/05457 can be used in particular. International Patent Disclosure WO 97/05457 corresponds to U.S. Pat. No. 5,841,134, the entire contents of which are incorporated herein by reference. With regard to the structure of the scanning unit for generating the incremental signals, this international application is hereby incorporated by reference.

Further advantages of the invention will become clear from the ensuing description of an exemplary embodiment in conjunction with the drawings.

BRIEF DESCRIPTION OF THE DRAWINGS

FIG. 2b shows a second embodiment of a sensor system for scanning the incremental track of FIG. 1 according to the present invention;

DETAILED DESCRIPTION OF THE PREFERRED EMBODIMENTS OF THE INVENTION

Figure 1:
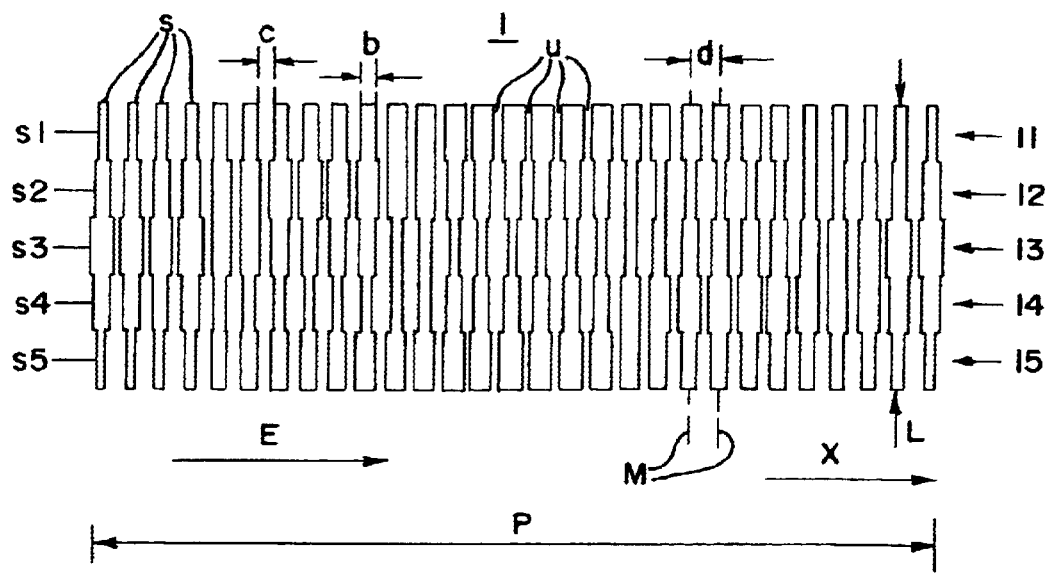
FIG. 1 is a schematic illustration of an embodiment of a line structure that forms an incremental track, and in which the line width varies to generate absolute position information according to the present invention.

FIG. 1 schematically shows an embodiment of a line structure that can be used as an incremental track 1 of a position measuring system to determine the relative position of two objects movable relative to one another. To that end, the line structure is assigned to the first of these two objects and is scanned by a scanning unit provided on the second object.

The line structure includes many individual lines (denoted as s), which are oriented transversely to the longitudinal direction E of the incremental track 1 and are disposed side-by-side in the longitudinal direction E of the incremental track 1, and whose length L corresponds to the width of the incremental track 1. The lines s are each embodied symmetrically with respect to a longitudinal axis (center axis M) extending transversely to the longitudinal direction E of the incremental track 1 and are disposed side-by-side with a constant spacing d of their center axes M.

The incremental track 1 shown in FIG. 1 is subdivided into five partial tracks 11, 12, 13, 14, 15, which are located side-by-side transversely to the longitudinal direction E of the incremental track 1 and which each have the same length as measured transversely to the longitudinal direction E of the incremental track 1. Within each of the partial tracks 11–15, the line width b (that is, the width of the lines s as measured along the longitudinal direction E of the incremental track 1) varies in accordance with a defined trigonometric function.

As a result of the subdivision of the incremental track 1 into a total of five partial tracks 11–15 disposed side-by-side, the lines s are also subdivided into five portions s1, s2, s3, s4 and s5. Accordingly, in each of the partial tracks 11, 12, 13, 14 and 15, a characteristic periodic change in the width b of the associated portion s1, s2, s3, s4, and s5 of the individual lines s also occurs.

In the following description, let each point on the incremental track 1 in the longitudinal direction E be assigned an angle x between 0° and 360°. Then in the two outer partial tracks 11 and 15 of the incremental track 1, the line width b varies in accordance with the function sin x. In the second partial track 12 located next to the first partial track 11, the line width b varies in accordance with the trigonometric function cos x displaced by 90°, and in the third partial track 13, there is a variation in the line width b corresponding to −sin x and in the fourth partial track 14 corresponding to −cos x.

The variation of the line width b in all five side-by-side partial tracks 11–15 of the incremental track 1 is accordingly determined on the basis of the trigonometric function sin x, and there is a phase displacement of 90° between each two side-by-side partial tracks.

In the above-described choice of the trigonometric functions associated with the individual partial tracks, the area that is covered by the first four portions s1–s4 of the individual lines s is identical for all the lines s, since sin x +cos x+(−sin x)+(−cos x)=0. The same is true for the area of the interstices between adjacent portions s1–s4 of two lines s. Upon addition over the first four partial tracks 11–14, the result is accordingly a constant line width to gap width ratio, which is preferably selected to be equal to 1.

In addition, and conversely, the width of the individual lines s and of the associated gaps is not constant over all five partial tracks 11–15, since the function sin x occurs twice, namely in the first partial track 11 and in the fifth partial track 15.

However, this problem can be readily overcome in the generation of the sensor signals by weighting the signals originating from the partial tracks 11 and 15 only half as much as the signals originating in the other partial tracks 12–14. It is important only that a constant line width occurs when the portions s1–s4 of the lines s in the partial tracks 11–14 in which the line width varies in accordance with different trigonometric functions are added together.

The embodiment, described in conjunction with FIG. 1, of an incremental track with a periodic line structure that has an additional structure superimposed on it can be used especially advantageously in the case of a rotary measuring system. In this case, the incremental track 1 extends along the circumference of a graduated disk of the measuring system, and the individual lines of the incremental track are each assigned different angles x on the graduated disk.

Because of the constant spacing d between the center axes M of the side-by-side lines s, this line structure has a first, small period d, which serves to generate the incremental signal.

Because of the modulation of the width b of the individual portions s1–s5 of the lines s with a period P that corresponds to the circumference of the pitch circle of the graduated disk on which the incremental track 1 extends, the line structure of the incremental track 1 includes not only the aforementioned incremental information but also absolute position information pertaining to the position of the two objects movable relative to one another.

When the incremental track 1 of FIG. 1 is disposed on a circular graduated disk, the following equations apply for the mean line widths b1, b2, b3, b4 and b5 of the individual portions s1–s5 of the lines s:

$$b1 = \pi \cdot t1 \cdot (1 + m \cdot \sin x)/(2 \cdot z)$$

$$b2 = \pi \cdot t2 \cdot (1 + m \cdot \cos x)/(2 \cdot z)$$

$$b3 = \pi \cdot t3 \cdot (1 - m \cdot \sin x)/(2 \cdot z)$$

$$b4 = \pi \cdot t4 \cdot (1 - m \cdot \cos x)/(2 \cdot z)$$

$$b5 = \pi \cdot t5 \cdot (1 + m \cdot \sin x)/(2 \cdot z)$$

The variables t1–t5 indicate the diameter of the pitch circle on which the corresponding partial track 11, 12, 13, 14 and 15 is disposed. The variable z stands for the number of side-by-side lines (in the example of FIG. 1, z=28), and the variable m designates the degree of modulation of the line width in the various partial tracks. Here, the same degree of modulation m has been selected for all the partial tracks. To establish a constant line width to gap width ratio over all five partial tracks, however, a different degree of modulation can also be selected for the various partial tracks.

Alternatively, a variation of the line width b can also be provided such that the line width to gap width ratio in the partial tracks 11–15 (that is, the ratio between the line width b of a line s and the width c of the interstice u located beside this line s and extending to the next line) is varied in accordance with a trigonometric function. Then, the line width to gap width ratio in the two outer partial tracks 11 and 15 of the incremental track 1 varies in accordance with the function sin x. In the second partial track 12, located next to the first partial track 11, the line width to gap width ratio varies by the trigonometric function cos x displaced by 90°, and in the third partial track 13, there is a variation of the line width to gap width ratio of −sin x, and in the fourth partial track 14 of −cos x.

Accordingly, in all five side-by-side partial tracks 11–15, a variation in the line to gap ratio takes place on the basis of the trigonometric function sin x, and in each case there is a phase displacement of 90° between partial tracks located side-by-side.

To summarize, generating the incremental and the absolute position information from a single incremental track is achieved by providing that the basic structure of the incremental track, which is defined by the disposition of individual lines at a defined spacing (with respect to their longitudinal axes) is preserved. Superimposed on this basic structure of the incremental track is the additional absolute position information from a suitable variation of the breadth of the lines along the longitudinal direction of the incremental track (variation of the line width). As a result, the absolute position information can be evaluated regardless of the basic structure of the incremental track. In other words, the division period of the line structure of the incremental track is preserved; only the width of the individual lines varies.

Figure 2A:
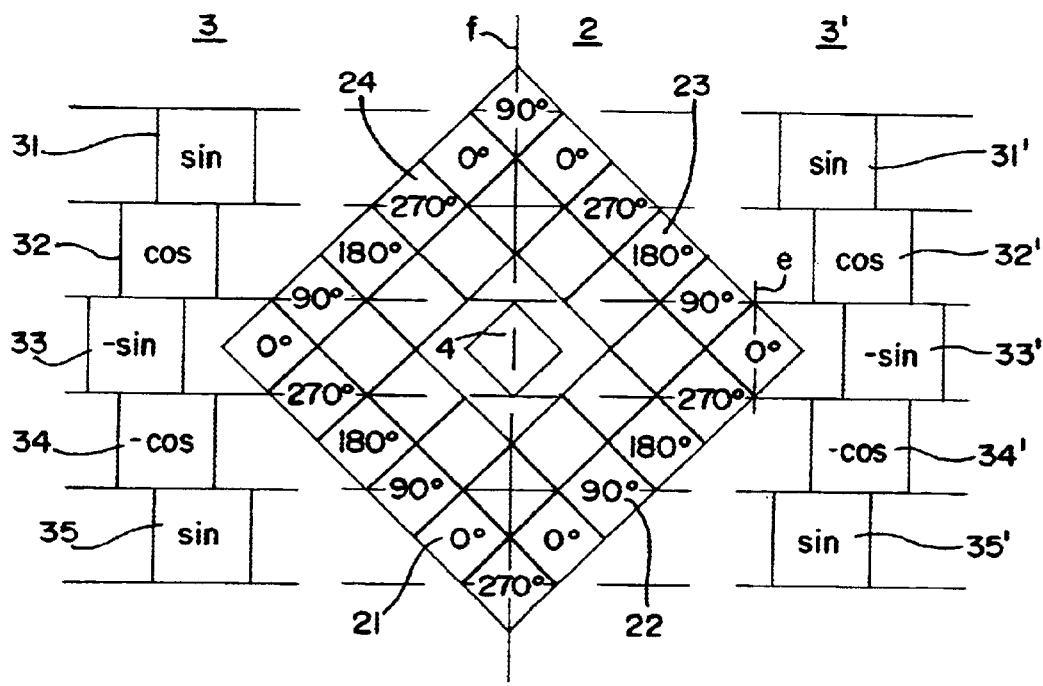
FIG. 2a shows a first embodiment of a sensor system for scanning the incremental track of FIG. 1 according to the present invention.

In FIG. 2a, a sensor system is shown with which the incremental track of FIG. 1 (whose partial tracks are suggested by dashed lines in FIG. 2a) can be scanned both to generate the incremental information about the position of the two objects movable relative to one another and for generating the absolute position information; the individual partial tracks 11–15 of the incremental track 1 scanned by the scanning unit 2 are suggested in FIG. 2a by dashed lines. To generate the incremental information, a scanning unit 2 having a plurality of sensors is provided, and for generating the absolute position information, two further sensor groups 3, 3' are provided.

The sensors of both the scanning unit 2 and of the additional sensor groups 3, 3' are photoreceivers, which are assigned a common light source 4 in the center of the sensor system. The sensor system is disposed above the incremental track of FIG. 1 in such a way that the light emitted by the light source 4 is reflected by the incremental track and then strikes the photoreceivers of the sensor system. Instead of the above-described incident light process, the measuring system of the invention can also be operated by the transmitted light process, however.

The scanning unit 2 is a photoreceiver matrix of the kind known from WO 97/05457, which is hereby entirely incorporated by reference. Hereinafter, accordingly only the essential characteristics of this scanning unit will be explained in summary fashion.

The photoreceiver matrix includes a total of thirty-two photoreceivers; in principle, any integral multiple of the number four is suitable for the number of photoreceivers. The individual photoreceivers of the matrix are disposed in checkerboard fashion in a square; in the center position, there is not a photoreceiver but instead a light source 4. The photoreceivers themselves are also square and are arranged in such a way that their diagonals e extend parallel to the diagonals f of the photoreceiver matrix and transversely to the longitudinal direction E of the incremental track 1 (that is, parallel to the longitudinal direction of the individual lines s of the incremental track 1).

A distinction is made among four different types of photoreceivers of the scanning unit 2, specifically in terms of their phase relationship relative to the incremental track 1. There are photoreceivers 21 with the phase relationship of 0°, photoreceivers 22 with the phase relationship of 90°, photoreceivers 23 with the phase relationship of 180°, and photoreceivers 24 with the phase relationship of 360°; these phase relationships are expressly shown in FIG. 2a for some of the photoreceivers 21–24.

It is of particular important in this respect that all the photoreceivers that cover a partial track with a certain trigonometric function (regardless of its sign) each have the same phase relationship. Thus, the photoreceivers 21 with the phase relationship of 0° each cover the partial tracks 11, 13 and 15 having the trigonometric functions of sin x and −sin x, respectively; the photoreceivers 23 with the phase relationship of 180° each cover the partial tracks 12 and 14 having the trigonometric functions of cos x and −cos x, respectively; the photoreceivers 22 with the phase relationship of 90° each cover two partial tracks having the trigonometric functions of sin x and cos x, respectively, the two trigonometric functions having different signs; and finally, the photoreceivers 24 with the phase relationship of 270° each cover two partial tracks with the trigonometric functions of sin x and cos x, respectively, the two trigonometric functions having the same sign.

All the photoreceivers with the same phase relationship are interconnected to evaluate the signals they generate. This means that the photoreceivers that scan the partial tracks 11, 13, 15 with a variation of the line width corresponding to the function sin x and −sin x are connected to one another, and on the other hand, the photoreceivers that scan the partial tracks 12, 14 with a variation of the line width in accordance with the functions cos x and −cos x are connected to one another. The photoreceivers 21, 23 with a phase relationship of 0° and 180°, respectively, are each assigned precisely to one of the partial tracks 11–15 having a variation of the line width in accordance with the functions sin x or −sin x or the function cos x or −cos x. The other photoreceivers 22, 24, by comparison, each cover two adjacent partial tracks, that is, one of the type sin x or −sin x, and one of the type cos x or −cos x.

By the described embodiment of the scanning unit 2, it is attained that each photoreceiver of the scanning unit 2 is connected to another photoreceiver of the same phase relationship that covers a partial track in which the line width varies in accordance with the same trigonometric function but with the opposite sign compared to the partial track covered by the first photoreceiver mentioned.

In summary, the scanning unit 2 covers the incremental track 1 along its entire width I (transversely to the longitudinal direction E), and the line structure of the incremental track 1 and the disposition of photoreceivers in the scanning unit 2 are selected such that by averaging over the variation of the line width, an incremental signal is generated that is based on the division period d of the line structure.

In FIG. 2a, additional sensor groups 3, 3' are also disposed on both sides of the scanning unit 2 and are intended to generate the absolute position information by scanning the incremental track 1. These sensors are once again square photoreceivers 31–35 and 31'–35', respectively, but they are disposed rotated by 45° compared to the photoreceivers of the scanning unit 2. Thus the sides of the photoreceivers 31–35, 31'–35' each extend parallel and perpendicular, respectively, to the longitudinal direction E of the incremental track 1.

The photoreceivers 31–35, 31'–35' are each assigned in pairs to a certain incremental track, specifically on both sides of the scanning unit 2. The two photoreceivers 31, 31'; 32, 32'; 33, 33'; 34, 34'; and 35, 35' facing one another in the longitudinal direction E of the incremental track 1 are each connected to one another and thus form a signal pertaining to the middle of the entire sensor system. The photoreceivers are dimensioned in such a way that the signals obtained each correspond to an averaging over a plurality of lines of the line structure of the incremental track 1.

The scanning unit 2 shown in FIG. 2a is suitable not only for scanning the special incremental track 1 of FIG. 1. Instead, it can also scan a conventional incremental track in which no variation of the line width as in FIG. 1 is provided. In comparison with the known scanning unit with a photoreceiver matrix in accordance with WO 97/05457, the scanning unit 2 offers certain advantages. For instance, the scanning unit of WO 97/05457 does not guarantee that the scanning signals generated will not have so-called double periods; such a double period is distinguished in particular by different signal amplitudes within one signal period. For a discussion of the problematic double period in the scanning signal, see the dissertation by J. Willhelm entitled Dreigitterschrittgeber (Three Grid Encoder), 1978, page 60. As stated there, a double period of this kind is due to the influence of diffraction orders that are not eliminated, and in particular zeroth-diffraction orders that occur in one of the gratings involved in the scanning beam. In the interpolation of this kind of interfered-with scanning signal, the result in the final analysis is errors in the position determination.

With the aid of the scanning unit 2, when conventional incremental tracks are scanned, the occurrence of such a double period can be avoided. This can be ascribed to the fact that because of the selected geometry and interconnection of the various photoreceivers 21–24 in the scanning unit 2, an averaging over different signal components results in the scanning. This leads to a uniform modulation of the scanning signal within one signal period.

Furthermore, in the use of such a scanning unit 2, it is assured that possible changes in the spacings of the scanned pattern of lines have as little interfering effect on the scanning signal as any possible tilting of the pattern of lines.

For further explanation of the scanning unit, see FIG. 2b, which shows a slightly modified scanning unit 200, for example of FIG. 2a, in conjunction with a part of the scanned pattern of lines S. With the aid of the scanning unit 200 shown in FIG. 2b, it is possible to generate four incremental scanning signals that each have a phase offset of 90° from one another.

In the exemplary embodiment of FIG. 2b, the scanning unit 200 includes a total of thirty-two separate photoreceivers, each with a square base and with an edge length $KL_F$. The thirty-two photoreceivers are disposed in the form of a rhombus-shaped array, which assumes an angle of 45° to the scanned pattern of lines S. Photoreceivers with various phase relationships with respect to the scanning signals are provided: the photoreceivers 210 have the phase relationship of 0°, the photoreceivers 220 have the phase relationship of 90°, the photoreceivers 230 have the phase relationship of 180°, and the photoreceivers 240 have the phase relationship of 270°. The corresponding phase relationships are explicitly shown in FIG. 2b for the various photoreceivers. Not shown in FIG. 2b, however, is that all of the in-phase photoreceivers are interconnected with each of one another, so that in a known manner the incremental scanning signals can be furnished for further processing.

The rhombus-shaped array in the exemplary embodiment of FIG. 2b has an edge length $KL_A = 6 \cdot KL_F$. In the four central fields ZF1–ZF4 in the middle of the array, there are no photoreceivers, in this example; in the example of FIG. 2b, the light source 4 would instead be provided. However, depending on the optical scanning principle, this region can also be left empty, and so forth.

The exemplary embodiment of an advantageous scanning unit 200 shown in FIG. 2b can also be modified in terms of the number of individual photoreceivers, in order to meet certain demands if needed; however, in all the modifications described below the aforementioned advantages are obtained.

For instance, in a further embodiment of the scanning unit, the edge length $KL_A$ of the rhombus-shaped array, for the same size of the individual photoreceivers, can be selected as $KL_A = 8 \cdot KL_F$. In that case, in contrast to the example of FIG. 2b, photoreceivers would be provided in the middle of the array. There would then not be any regions in the array in which there were no photoreceivers. The number of photoreceivers required in this example would accordingly be sixty-four.

In a further embodiment of the scanning unit, the edge length $KL_A$ of the rhombus-shaped array, for the same size of individual photoreceivers, would be selected as $KL_A = 10 \cdot KL_F$. Analogously to the first example, the central four photoreceivers would be missing; that is, ninety-six required photoreceivers are the result.

The next larger variant of such a scanning unit has an edge length $KL_A$ of the rhombus-shaped array, for the same size of the individual photoreceivers, of $KL_A = 12 \cdot KL_F$. In this embodiment, there would then have to be sixteen central photoreceivers missing from the middle, so that the array includes a total of one hundred twenty-eight photoreceivers.

Analogously to this, even larger scanning units can be dimensioned by identical principles. The different variants of such scanning units have the following features in common, which guarantee the aforementioned advantages:

a) the square photoreceivers with the edge length $KL_F$ are each arranged in the form of a rhombus-shaped array, and the array is oriented at an angle of 45° to the scanned pattern of lines;

b) an integral multiple of the edge length $KL_F$ of the photoreceivers is provided as the edge length $KL_A$ of the array;

c) depending on the edge length of the array, the array is either completely filled with photoreceivers, or optionally a certain number of central photoreceivers are missing; the following principles apply:

c1) edge length of the array $KL_A = n \cdot (8 \cdot KL_F)$, where $n = 1, 2, 3, \ldots$ : the array is completely filled with photoreceivers;

c2) edge length of the array $KL_A = (2 \cdot (2n+1)) \cdot KL_F$, where $n = 1, 2, 3, \ldots$ : the four central photoreceivers are missing from the array;

c3) edge length of the array $KL_A = (4 \cdot (2n+1)) \cdot KL_F$, where $n = 1, 2, 3, \ldots$ : the sixteen central photoreceivers are missing from the array.

Figure 3:
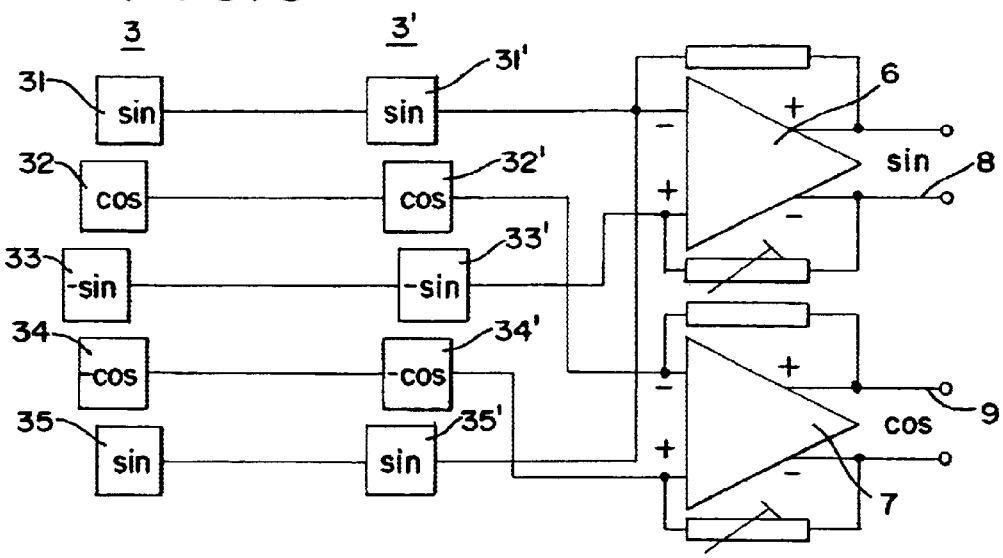
FIG. 3 shows an embodiment of a circuit arrangement according to the present invention for the sensor elements that serve to generate a signal with absolute position information.

On the basis of the circuit arrangement shown in FIG. 3 for the photoreceivers 31–35, 31'–35' for generating the signals for the absolute position information, it is clear that furthermore the various photoreceivers that scan partial tracks in which the trigonometric functions determining the variation of the line width are offset from one another by one-half of a period (that is, those that have an opposite sign), are interconnected subtractively via a subtractor 6 and 7, respectively. As a result of this type of interconnection of the individual photoreceivers 31–35, 31'–35', signals occur at the outputs 8, 9 of the two subtractors 6, 7 in which both the offset and the equal-level differences between the individual tracks are eliminated. Furthermore, the effects of crosstalk between adjacent partial tracks are also compensated for, since the two neighboring tracks of a given partial track are each characterized by trigonometric functions with opposite signs.

Corresponding effects can also be attained in generating the incremental signals, by providing that the photoreceivers 21 and 23, on the one hand, and 23 and 25, on the other, whose phase relationship differs by one-half of a period are interconnected subtractively.

To compensate for the equal-level differences, either the photoreceivers 31, 35; 31', 35' that are assigned to the two incremental tracks 11, 15 with the trigonometric function sin x are only half as large as the other photoreceivers 32–34; 32'–34', or the signals of these photoreceivers are weighted with only a lesser weight in the amplifiers. This takes into account the fact that two partial tracks 11, 15 are present in which the line width varies by the trigonometric function sin x, while each of the other trigonometric functions occurs only in one of the partial tracks 12–14.

Figure 4:
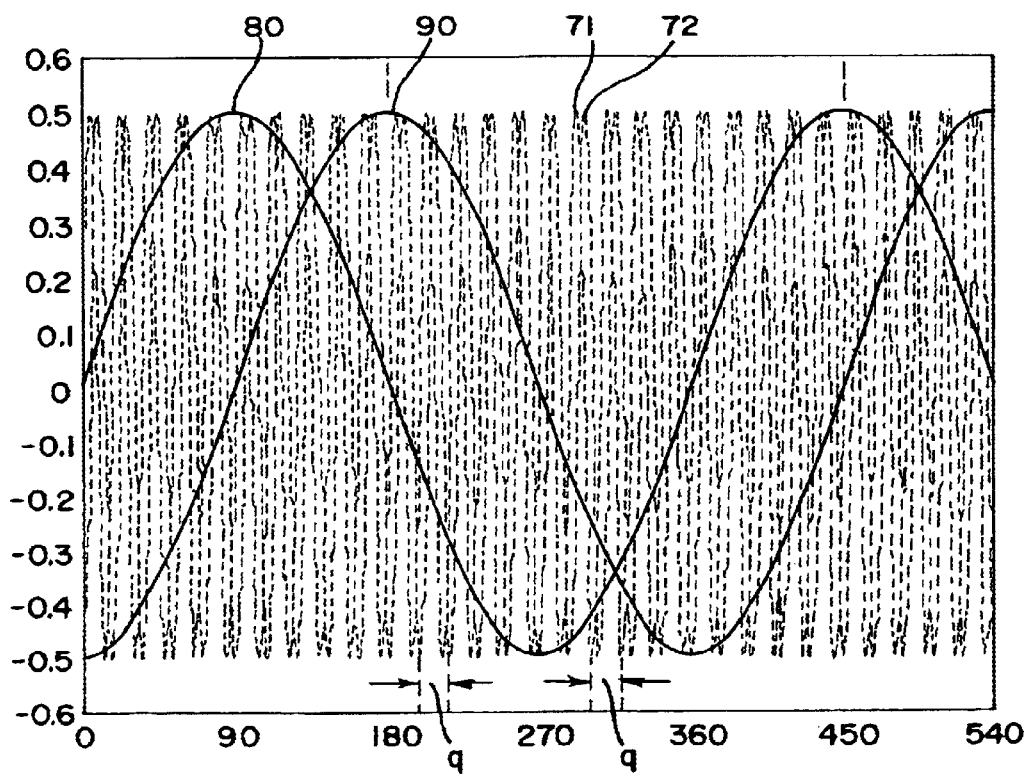
FIG. 4 is an illustration of the signals that are generated when the embodiment of the line structure shown in FIG. 1 is scanned.

In FIG. 4, as a function of the angle x, the signals 80, 90 are shown that are present at the outputs 8, 9 of the circuit arrangement of FIG. 3 during operation of the position measuring system; for the sake of clear illustration, one incremental track of a rotary transducer with twenty lines has been made the basis. The signals in FIG. 4 thus represent 1.5 revolutions of the corresponding graduated disk, or a revolution about an angle of 540°. The signals 80, 90 (except for factors and additive constants) are the trigonometric functions sin x (at the first output 8 of the circuit arrangement) and cos x (at the second output 9 of the circuit arrangement). From these two signals 80, 90, whose period P=360° corresponds to the circumference of the incremental track 1 on the graduated disk of the position measuring system, the position of two objects relative to one another can be determined directly (absolute position information). Furthermore, evaluating the signals offset by 90° from one another also makes it possible to determine the direction of rotation.

In FIG. 4, the two incremental signals 71, 72 offset from one another by 90° can also be seen; they are generated by the scanning unit 2 shown in FIG. 2. From these signals, with a short period q, upon each motion of the objects, equipped with the position measuring system, relative to one another, the distance or rotary angle of this motion can be determined highly accurately, and the direction of rotation can be ascertained.

The invention has been described in the above-described exemplary embodiment entirely in terms of a position measuring system in which the incremental track is illuminated by a light source and scanned by photoreceivers. However, the embodiment according to the invention of the line structure of the incremental track can also be employed in position measuring systems that have other types of sensors.

Furthermore, the invention can be employed not only in rotary measuring systems, as described above, but also in linear measuring systems. In the latter case, the incremental track is subdivided into six partial tracks, for instance, with which three periodically oscillating functions with a slightly different period are associated, so that the absolute position information can be generated by the Nonius or Vernier principle. For the total of three different trigonometric functions, six partial tracks are needed, since for each partial track with a defined trigonometric function, a further partial track with the function phase-displaced by one-half of a period should be provided.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A position measuring system for generating phase-offset incremental signals from scanning of a pattern, said system comprises:

a pattern with individual lines that extend along a first direction;

a light source that emits a beam of light that interacts with said pattern;

a scanning unit that receives light as a result of said beam of light interacting with said pattern, said scanning unit comprising:

a rhombus-shaped array of individual photoreceivers that has an edge that is disposed at an angle of 45° relative to said first direction;

wherein said array is completely filled with said photoreceivers and each of said photoreceivers has the same shape and size, and said edge of said array has a length that is 8·n times the length of one of said photoreceivers, and n=1, 2, 3, . . . .

2. The position measuring system of claim 1, wherein said photoreceivers furnish scanning signals with different relative phase relationships.

3. The position measuring system of claim 2, wherein said photoreceivers furnish scanning signals having the phase relationships of 0°, 90°, 180° and 270°.

4. The position measuring system of claim 2, wherein those photoreceivers that have identical phase relationships are interconnected with one another.

5. The position measuring system of claim 1, wherein said array of individual photoreceivers ensure that scanning signals generated by said scanning unit will not have double periods.

6. A position measuring system for generating phase-offset incremental signals from scanning of a pattern, said system comprises:

a pattern with individual lines that extend along a first direction;

a light source that emits a beam of light that interacts with said pattern;

a scanning unit that receives light as a result of said beam of light interacting with said pattern, said scanning unit comprising:

a rhombus-shaped array of individual photoreceivers that has an edge that is disposed at an angle of 45° relative to said first direction;

wherein said array is filled with said photoreceivers except for missing four centrally located photoreceivers and each of said photoreceivers has the same shape and size, and said edge of said array has a length that is 2·(2n+1) times the length of one of said photoreceivers, and n=1, 2, 3, . . . .

7. The position measuring system of claim 6, wherein said photoreceivers furnish scanning signals with different relative phase relationships.

8. The position measuring system of claim 7, wherein said photoreceivers furnish scanning signals having the phase relationships of 0°, 90°, 180° and 270°.

9. The position measuring system of claim 7, wherein those photoreceivers that have identical phase relationships are interconnected with one another.

10. The position measuring system of claim 6, wherein said array of individual photoreceivers ensure that scanning signals generated by said scanning unit will not have double periods.

11. A position measuring system for generating phase-offset incremental signals from scanning of a pattern, said system comprises:

a pattern with individual lines that extend along a first direction;

a light source that emits a beam of light that interacts with said pattern;

a scanning unit that receives light as a result of said beam of light interacting with said pattern, said scanning unit comprising:

a rhombus-shaped array of individual photoreceivers that has an edge that is disposed at an angle of 45° relative to said first direction;

wherein said array is filled with said photoreceivers except for missing sixteen centrally located photoreceivers and each of said photoreceivers has the same shape and size, and said edge of said array has a length that is 4·(2n+1) times the length of one of said photoreceivers, and n=1, 2, 3, . . . .

12. The position measuring system of claim 11, wherein said photoreceivers furnish scanning signals with different relative phase relationships.

13. The position measuring system of claim 12, wherein said photoreceivers furnish scanning signals having the phase relationships of 0°, 90°, 180° and 270°.

14. The position measuring system of claim 12, wherein those photoreceivers that have identical phase relationships are interconnected with one another.

15. The position measuring system of claim 11, wherein said array of individual photoreceivers ensure that scanning signals generated by said scanning unit will not have double periods.

* * * * *

UNITED STATES PATENT AND TRADEMARK OFFICE
CERTIFICATE OF CORRECTION

PATENT NO. : 6,747,262 B2
DATED : June 8, 2004
INVENTOR(S) : Joerg Willhelm

It is certified that error appears in the above-identified patent and that said Letters Patent is hereby corrected as shown below:

Title page,
Item [73], Assignee, delete, "Heiden Lain" and substitute -- Heidenhain -- in its place; and delete, "Traunrew" and substitute -- Traunreut -- in its place.

Signed and Sealed this

Nineteenth Day of April, 2005

JON W. DUDAS
*Director of the United States Patent and Trademark Office*